United States Patent
Dzhalazov

(10) Patent No.: US 11,582,974 B2
(45) Date of Patent: Feb. 21, 2023

(54) BIODEGRADABLE CONTAINER, METHOD OF FORMING AND FORMING APPARATUS

(71) Applicant: LAFFE LIMITED, Great Chesterford (GB)

(72) Inventor: Mladen Dzhalazov, Plovdiv (BG)

(73) Assignee: Laffe Limited

( * ) Notice: Subject to any disclaimer, the term of this patent is extended or adjusted under 35 U.S.C. 154(b) by 0 days.

(21) Appl. No.: 17/435,854

(22) PCT Filed: Mar. 4, 2020

(86) PCT No.: PCT/EP2020/055750
§ 371 (c)(1),
(2) Date: Sep. 2, 2021

(87) PCT Pub. No.: WO2020/178356
PCT Pub. Date: Sep. 10, 2020

(65) Prior Publication Data
US 2022/0039397 A1    Feb. 10, 2022

(30) Foreign Application Priority Data

Mar. 4, 2019 (GB) ..................... 1902859

(51) Int. Cl.
*A21B 5/02*      (2006.01)
*A23P 30/10*    (2016.01)
(Continued)

(52) U.S. Cl.
CPC ............... *A21B 5/026* (2013.01); *A21B 5/02* (2013.01); *A21C 11/006* (2013.01); *A21C 11/10* (2013.01); *A21D 13/33* (2017.01); *A23P 30/10* (2016.08)

(58) Field of Classification Search
CPC ......... A21B 5/026; A21B 5/02; A21C 11/006; A21C 11/10; A21C 11/00; A21C 15/025;
(Continued)

(56) References Cited

U.S. PATENT DOCUMENTS 1,342,045 A * 6/1920 Hamwi ............... A21B 5/026
                                                            99/383
1,420,378 A * 6/1922 Inghram ............ A21B 5/026
                                                            99/373
(Continued)

FOREIGN PATENT DOCUMENTS

BG         2894 U1      3/2018
GB      1065581          4/1967
(Continued)

OTHER PUBLICATIONS

Combined Search and Examination Report for GB1902859.6; dated Sep. 27, 2019; 9 pgs.
(Continued)

*Primary Examiner* — Drew E Becker
(74) *Attorney, Agent, or Firm* — Gardner, Groff & Greenwald, P.C.

(57) ABSTRACT

There is disclosed a method of forming a biodegradable container, such as a cup, comprising a plurality of successive press forming operations, each press forming operation comprising relative movement between an outer die 202 and an inner punch 204 from an open configuration to a forming configuration to shape a dough 400 as it expands. There is also disclosed a corresponding forming apparatus and container.

18 Claims, 11 Drawing Sheets

(51) Int. Cl.
*A21D 13/33* (2017.01)
*A21C 11/00* (2006.01)
*A21C 11/10* (2006.01)

(58) Field of Classification Search
CPC ......... A21C 15/02; A21D 13/33; A23P 30/10; B29C 37/005; B29C 37/02; B29C 39/40; B29C 2791/008
See application file for complete search history.

(56) References Cited

U.S. PATENT DOCUMENTS

| | | | | |
|---|---|---|---|---|
| 1,438,541 A * | 12/1922 | McLaren | ............... | A21B 5/026 426/391 |
| 1,448,294 A * | 3/1923 | Hauge | ............... | A21B 5/026 99/383 |
| 2,565,245 A * | 8/1951 | Lebovitz | ............... | A23B 4/068 100/910 |
| 2,749,853 A * | 6/1956 | Graham | ............... | A21B 5/026 425/347 |
| 3,431,869 A * | 3/1969 | Barton | ............... | A21B 5/026 426/514 |
| 4,281,593 A * | 8/1981 | Gevaert | ............... | A21B 5/02 99/323.4 |
| 4,303,677 A * | 12/1981 | De Acetis | ............... | A21C 11/006 426/94 |
| 4,313,964 A * | 2/1982 | Dembecki | ............... | A21B 3/13 426/549 |
| 5,000,084 A * | 3/1991 | Walliker | ............... | A21D 13/32 426/279 |
| 5,693,355 A * | 12/1997 | Haas | ............... | A21C 15/025 99/383 |
| 5,709,827 A | 1/1998 | Andersen et al. | | |
| 5,753,292 A * | 5/1998 | Haas | ............... | A21C 15/025 99/383 |
| 6,391,363 B1 | 5/2002 | Thiele | | |
| 11,213,037 B2 * | 1/2022 | Völkl | ............... | A22C 7/0061 |
| 2004/0069153 A1 * | 4/2004 | Smith | ............... | A21C 11/006 99/349 |
| 2004/0219271 A1 | 11/2004 | Belknap et al. | | |
| 2004/0265453 A1 * | 12/2004 | Helou, Jr. | ............... | A21B 5/026 426/512 |
| 2012/0003363 A1 * | 1/2012 | Beloff | ............... | A21B 5/026 426/138 |
| 2019/0183132 A1 * | 6/2019 | Zapryanov | ............... | A21C 11/006 |

FOREIGN PATENT DOCUMENTS

| | | |
|---|---|---|
| JP | 2003102370 A | 4/2003 |
| WO | 2006135989 A1 | 12/2006 |
| WO | 2011067733 A1 | 6/2011 |
| WO | 2014059543 A1 | 4/2014 |

OTHER PUBLICATIONS

International Search Report and Written Opinion for PCT/EP2020/055750; dated May 27, 2020; 16 pgs.

International Preliminary Report on Patentability for PCT/EP2020/055750; dated Feb. 17, 2021; 15 pgs.

* cited by examiner

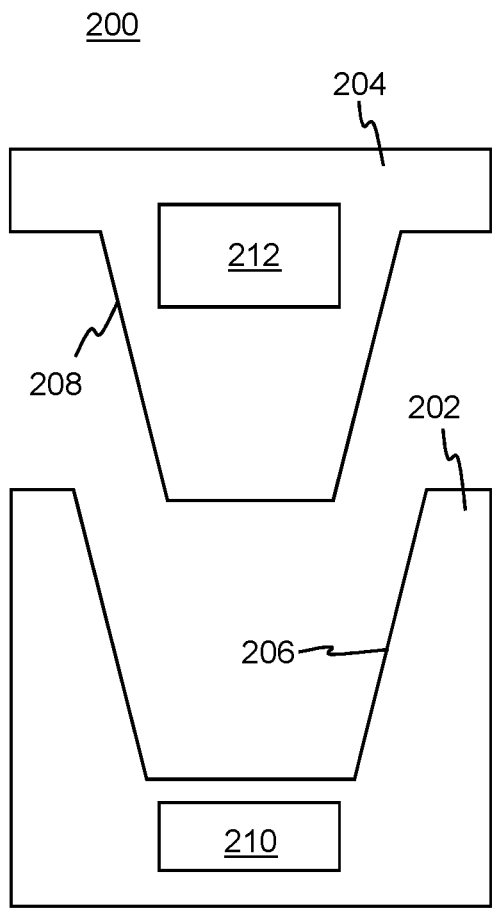
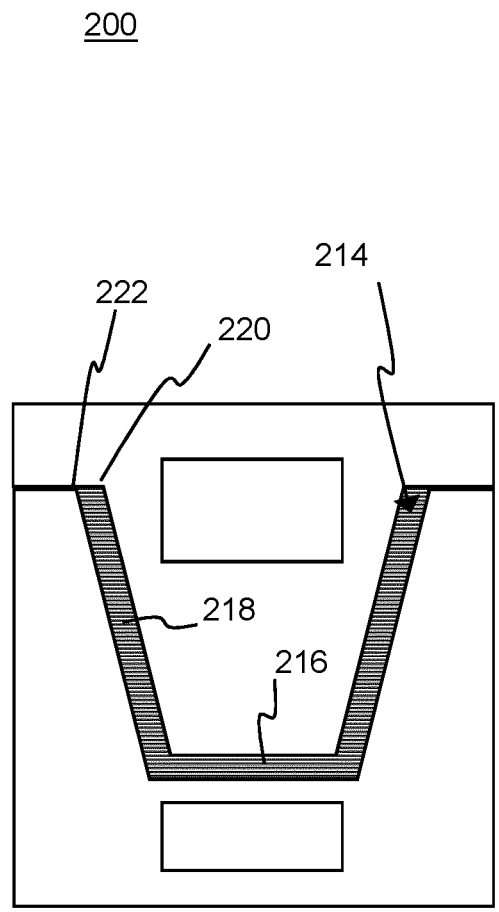
Figure 2a          Figure 2b
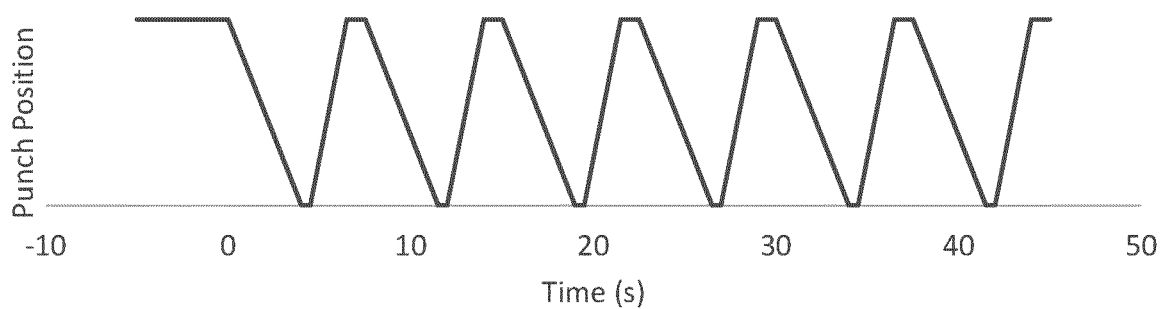
Figure 3

1100
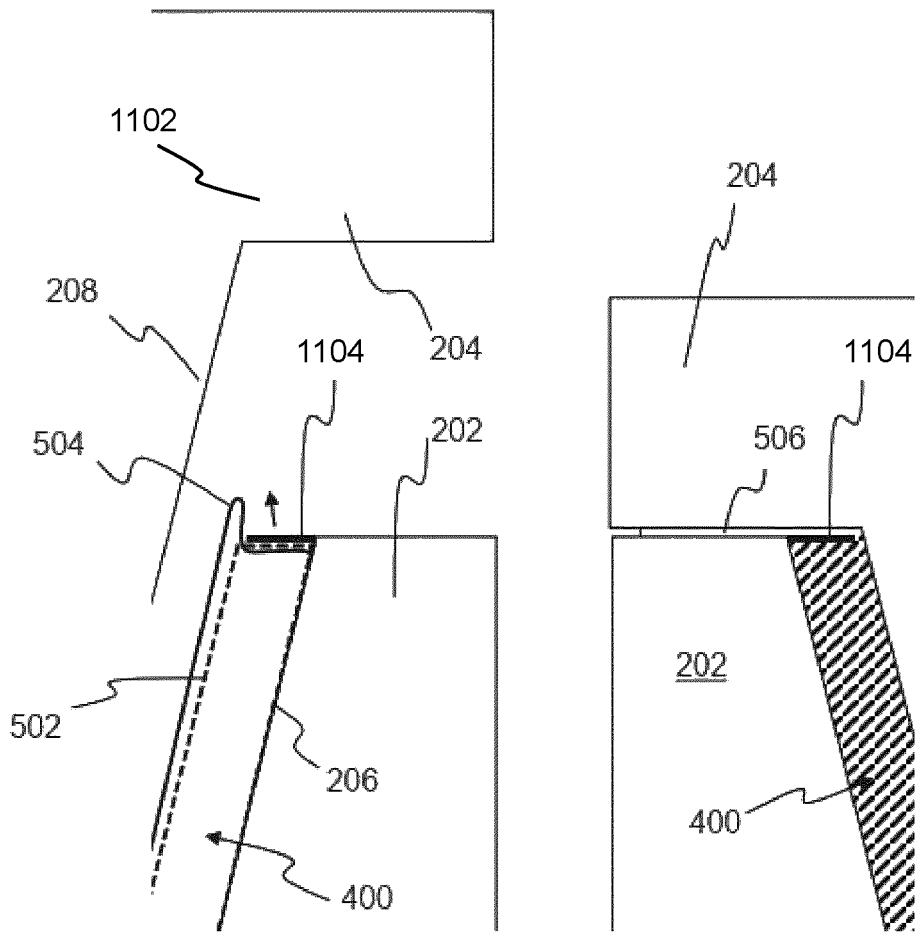
Figure 12b
Figure 12a
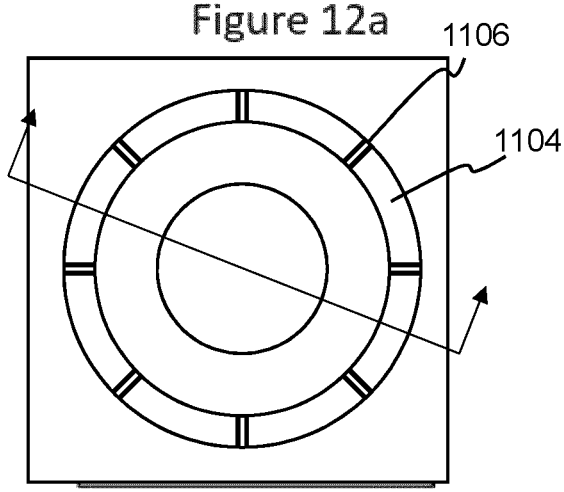
Figure 12c

BIODEGRADABLE CONTAINER, METHOD OF FORMING AND FORMING APPARATUS

BACKGROUND

The invention relates to a biodegradable container, a method of forming a biodegradable container and a forming apparatus.

Conventional single-use containers are an environmental hazard as they typically contain non-recyclable materials, require specialist recycling facilities, or are simply unlikely to be recycled by consumers.

It is known to manufacture compostable containers from vegetable products, however these are expensive to manufacture. Attempts have been made to manufacture biodegradable containers from a dough, for example an edible biodegradable container. Previously-considered manufacturing methods for such containers typically involve the use of expensive high-pressure presses to form a dough in a closed two-part mould. High pressure must be applied to resist forcing owing to water vaporization or expansion of the dough. An example of such a manufacturing method is described in BG2894U1.

With reference to FIG. 1, such previously-considered methods may result in a formed container 100 which has a rim 102 of uneven height around its perimeter, owing to uneven flow and expansion of the dough within the mould. Accordingly, such manufacturing methods typically use a mould which permits the dough to expand significantly above a desired height 104 of the container, such that the formed container can then be trimmed to the desired shape.

Accordingly, it is desirable to provide an improved manufacturing process.

SUMMARY OF INVENTION

According to a first aspect of the invention there is provided a method of forming a biodegradable container, such as a cup, comprising:
  providing a mould assembly comprising an outer die and an inner punch, the outer die defining an outer forming surface for the container and the inner punch defining an inner forming surface for the container, the mould assembly having a forming configuration in which the outer and inner forming surfaces oppose one another to define a container wall volume corresponding to a formed shape of a wall of the container, and an open configuration in which the outer and inner forming surfaces are spaced apart more than in the forming configuration;
  placing a dough in the mould assembly between the outer die and the inner punch;
  heating the dough by heat transfer through the mould assembly to cause the dough to expand and bake;
  performing a plurality of successive press forming operations, each press forming operation comprising relative movement between the outer die and the inner punch from the open configuration to the forming configuration to shape the dough as it expands;
  wherein the dough expands between at least two successive press forming operations to fill the container wall volume, before baking is completed to provide the container.

Example containers are cups, bowls, boxes, trays, plates and the like, and lids for the same.

By successively press forming the dough as it expands, the method prevents an excessive build-up of pressure in the container wall volume owing to vaporisation of moisture in the dough and expansion of the dough.

Between successive press forming operations there is relative movement between the outer die and the inner punch to return from the forming configuration to the open configuration.

In some examples, a separation distance between the outer die and the inner punch may vary between successive returns to the open configuration, whereas in other examples the separation distance may be the same upon each successive return to the open configuration.

At least part of the mould assembly may be heated to a temperature of between 140-180° C., for heat transfer to the dough. The plurality of press forming operations may take place to bake the dough to form the container over a baking period of between 1 and 5 minutes, for example between 2-4 minutes or approximately 3 minutes. The baking period may be the total duration from insertion of dough into the mould assembly to removal of the formed container form the mould assembly.

A maximum pressure in the container wall volume when the mould assembly is in the forming configuration during any press forming operation may be low, for example below 1 MPa, preferably no more than 0.5 MPa, preferably no more than 0.2 MPa. The mould assembly may be configured to provide a vent to the container wall volume in the forming configuration, for example by a gap formed between the inner punch and the outer die, or other passageway which is configured to remain mechanically unsealed in the forming configuration (wherein a vent or passageway remains mechanically unsealed if it is only blocked by dough and not a mechanical arrangement). The container wall volume may therefore remain mechanically unsealed in the forming configuration.

The container wall volume may terminate at a rim defined by cooperation between the inner punch and the outer die, the rim corresponding to a rim of the container. The cooperation may be to substantially close the container wall volume in the forming configuration. The container wall volume may have a maximum thickness (i.e. shortest local distance between opposing surfaces at any point) of 1-5 mm, for example 2-3 mm.

The inner punch may comprise a moveable separation element (i.e. moveable relative to a main body of the inner punch which defines the inner forming surface for the container), which is moveable relative the main body of the inner punch to drive a formed container away from the inner forming surface. The separation element may be provided towards an end of the inner forming surface closest to the rim, and may define the rim in the forming configuration. In other examples, there may be no such moveable separation element. For example, a formed container may be separated from the mould assembly by detachment of two parts defining the outer die.

A waste portion of the dough may flow through a gap at the rim; and the method may further comprise removing the waste portion from the container. The waste portion may be removed by cutting between cooperating portions of the inner punch and the outer die.

It may be that the dough expands between the at least two successive press forming operations to fill and expand beyond the container wall volume while the inner punch is separated from the dough in the open configuration, before baking is completed to provide the container.

It may be that the plurality of press forming operations include: a first press forming operation in which the dough occupies a sub-portion of the container wall volume with the mould assembly in the forming configuration; and a subsequent forming operation in which a waste portion of dough expanding beyond the container wall volume is caused to pass through a gap at the rim. It may be that the gap is defined between the inner punch and the outer die in the forming configuration.

The mould assembly may comprise one or more waste cavities for receiving the waste portion. A plurality of waste cavities may be formed in the inner punch at angularly-spaced intervals over the rim, so as to receive respective waste portions expanding through the rim.

The outer die may comprise a cap defining a substantially planar surface of the rim, and the cap may comprise a plurality of gaps to permit waste portions of the dough to expand into the waste cavities. The cap may comprise a plurality of discrete elements. The cap provides for a particular smooth surface of the container at the rim.

The gap may be defined between the inner punch and the outer die in the forming configuration, and the method may comprise compressing a waste portion between the inner punch and the outer die to a thickness less than a minimum thickness of the container wall volume. Compressing the waste portion to a reduced thickness may enable easy removal of the waste portion at a weak point defined at the junction between the waste portion and the container wall, for example by brushing the waste portion away from the container wall, or passing the formed container through an aperture sized to snap the waste portion off from the container wall.

The mould assembly may remain in the forming configuration between successive press forming operations for a resting period.

It may be that there is a plurality of resting periods between respective press forming operations, wherein the durations of the resting periods reduce such that an earlier resting period has a greater duration than a later resting period. For example, the later resting period may be 75% or less, for example 50% or less than the earlier resting period. Over a plurality of such resting periods, the duration of the resting period may progressively reduce. The applicant has found that heat transfer to the dough is faster during the resting period (when the inner punch is in contact with the dough), and that vaporisation and the corresponding need to release vapour is more critical during the later stages of a baking operation. It is thought that this may be due to the temperature of the dough being closer to the saturation temperature at later stages of a baking operation such that water is more readily vaporised. Accordingly, the applicant has found that it can be advantageous to provide for longer resting periods during earlier stages of a baking operation, and shorter resting periods towards later stages of a baking operation.

It may be that the or each resting period is less than an interval between successive resting periods. For example, the resting period may be no more than 50%, or no more than 25%, or no more than 10% of an interval between successive resting periods. A longer resting period is associated with pressure build-up in the closed container wall volume owing to vaporisation of water in the dough and expansion of the dough, such that shortening of the resting period may reduce a peak pressure experienced in the container wall volume during forming, and lower peak loads which the apparatus must be designed to withstand. Further, a shorter resting period may prevent expansion of the dough into any recesses or formations on the inner forming surface (if present), so as to avoid an interlocking geometry between a formed container and the inner punch that may inhibit separation of the formed container.

The method may comprise a plurality of press sequences, each comprising:
- a respective one of the press forming operations;
- a rest operation in which the mould assembly remains in the forming configuration for a resting period; and
- a return operation in which the mould assembly returns to the open configuration;
- wherein for at least some of the press sequences, the resting period is no more than 30% of a total time period for the press sequence; or
- wherein for at least some of the press sequences, the resting period is no more than 4 s, for example no more than 2 s.

A press sequence may consist of a respective press forming operation, the rest operation and the return operation and optionally a wait operation as described herein The method may be a method of forming a cup, such as a coffee cup.

According to a second aspect there is provided forming apparatus for manufacturing a biodegradable container, such as a cup, comprising:
- a mould assembly comprising an outer die and an inner punch, the outer die defining an outer forming surface for the container and the inner punch defining an inner forming surface for the container, the mould assembly having a forming configuration in which the outer and inner forming surfaces oppose one another to define a container wall volume corresponding to a formed shape of a wall of the container, and an open configuration in which the outer and inner forming surfaces are spaced apart more than in the forming configuration;
- a heater configured to heat one of the outer die and the inner punch to transfer heat from the mould assembly to a dough received in the mould assembly in use;
- a controller configured to control the forming apparatus to perform a plurality of successive press forming operations, each press forming operation comprising relative movement between the outer die and the inner punch from the open configuration to the forming configuration, such that in use a dough received in the mould assembly is shaped as it expands to fill the container wall volume.

The inner punch and the outer die may be configured to cooperate in the forming configuration so as to define a rim of the container wall volume corresponding to a rim of the container. For example, there may be a gap (i.e. a clearance) at the rim between the inner punch and the outer die of no more than 1 mm, for example no more than 0.5 mm or no more than 0.2 mm. The forming apparatus may comprise a stop configured to stop relative movement of the outer die and the inner punch towards the forming configuration to provide the clearance.

The mould assembly may define a gap at the rim for flow of a waste portion of dough from the container wall cavity.

It may be that the controller is configured to control the forming apparatus to perform the plurality of successive press forming operations including a first press forming operation and a subsequent press forming operation, such that in use the dough received in the mould assembly is shaped as it progressively expands over the plurality of press forming operations to fill the container wall volume. It may be that in the open configuration the dough is permitted to expand beyond the container wall volume while the inner punch is separated from the dough, such that in use a waste portion expanding beyond the container wall volume is caused to pass through the gap at the rim to be removed.

The mould assembly may comprise one or more waste cavities for receiving the waste portion.

A plurality of waste cavities may be formed in the inner punch at angularly-spaced intervals over the rim, so as to receive respective waste portions expanding through the rim.

The outer die may comprise a cap defining a substantially planar surface of the rim, and the cap may comprise a plurality of gaps to permit waste portions of the dough to expand into the waste cavities. The cap may comprise a plurality of discrete elements.

The gap may be defined between the inner punch and the outer die in the forming configuration. The inner punch and the outer die may be configured to cooperate to compress a waste portion of dough which flows through the gap to a thickness less than a minimum thickness of the container wall volume, or to cut the waste portion of dough from the container.

For example, in some examples there may be no clearance at the rim such that the inner punch and the outer die engage one another to completely close the container wall volume and cut any waste portion form the wall of the container. For example, there may be a cutting element on one the inner punch and the outer die configured to cooperate with the other of the inner punch and the outer die (for example another cutting element or an anvil portion).

The controller may be configured to control the forming apparatus so that the mould assembly remains in the forming configuration between successive press forming operations for a resting period.

It may be that the controller is configured to control the forming apparatus to perform a plurality of press forming operations so that there is a plurality of resting periods between respective press forming operations.

It may be that the durations of the resting periods reduce such that an earlier resting period has a greater duration than a later resting period.

It may be that the or each resting period is less than an interval between successive resting periods.

The controller may be configured to control the forming apparatus to perform a plurality of press sequences, each comprising:
- a respective one of the press forming operations;
- a rest operation in which the mould assembly remains in the forming configuration for a resting period; and
- a return operation in which the mould assembly returns to the open configuration;
- wherein for at least some of the press sequences, the resting period is no more than 30% of a total time period for the press sequence; or wherein for at least some of the press sequences, the resting period is no more than 4 s, for example no more than 2 s.

The inner forming surface of the inner punch may be smooth.

A smooth inner forming surface may be free of retaining features, such as recesses or ridges configured to provide a lock between a formed dough or baked container and the inner forming surface.

The inner forming surface may be free of circumferentially-extending elongate retaining features and/or free of longitudinally-extending elongate retaining features (i.e. retaining features extend along a direction from a rim end of the container wall volume towards a base portion of the container wall volume. The inner forming surface may be free of elongate retaining features having a circumferential component and/or free of elongate retaining features having a longitudinal component.

The outer forming surface of the outer die may be smooth.

A smooth outer forming surface may be free of retaining features, such as recesses or ridges configured to provide a lock between a formed dough or baked container and the inner forming surface.

The outer forming surface may be free of circumferentially-extending elongate retaining features and/or free of longitudinally-extending elongate retaining features (i.e. retaining features extend along a direction from a rim end of the container wall volume towards a base portion of the container wall volume. The outer forming surface may be free of elongate retaining features having a circumferential component and/or free of elongate retaining features having a longitudinal component.

The outer die may comprise at least two parts detachably attached to each other and configured to be detached so as to release a container formed therein.

The forming apparatus may comprise a tunnel oven comprising the heater, and mechanical guide equipment defining a guide path for conveying the mould assembly through the tunnel oven. The guide path may be configured to determine relative movement between the outer die and the inner punch as a function of a position of the mould assembly along the guide path. The controller may be configured to control performance of the plurality of press forming operations by controlling movement of the mould assembly along the guide path.

The guide path may be defined by a rail having a profile corresponding to the relative movement of the outer die and the inner punch between the open configuration and the forming configuration.

A relative separation between the outer die and the inner punch during relative movement may be a function of a position of the mould assembly along the guide path. The controller may be configured to vary a speed of the mould assembly along the guide path to achieve a predetermined transient profile of the relative separation which differs from any transient profile of relative separation corresponding to constant speed of the mould assembly along the guide path.

The forming apparatus may be configured to cause performance of a method in accordance with the first aspect by controlling movement along the guide path.

A forming apparatus in accordance with the second aspect may comprise a machine-readable medium in accordance with the third aspect or a computer program in accordance with the fourth aspect.

According to a third aspect there is provided a biodegradable container, such as a cup, comprising a baked dough, the container having a wall terminating at a rim, wherein a roughness of one side of the wall is substantially equal to a roughness of the rim.

The biodegradable container may be formed by a method in accordance with the first aspect and/or using forming apparatus according to the second aspect.

According to a fourth aspect there is provided a machine-readable medium comprising instructions that, when executed by a processor, cause performance of a method in accordance with the first aspect.

According to a fifth aspect there is provided a computer program comprising instructions that, when executed by a processor, cause performance of a method in accordance with the first aspect.

The skilled person will appreciate that except where mutually exclusive, a feature described in relation to any one of the above aspects may be applied mutatis mutandis to any other aspect. Furthermore except where mutually exclusive any features described herein may be applied to any aspect and/or combined with any other feature described herein.

DETAILED DESCRIPTION

Embodiments will now be described, by way of example only, with reference to the accompanying drawings, in which:

FIG. 1 schematically shows a cross-sectional view of a previously-considered forming apparatus for forming a container;

FIGS. 2a and 2b schematically show cross-sectional views of an example forming apparatus in an open configuration and a forming configuration respectively;

FIG. 3 is a plot showing the position of an inner punch of the forming apparatus of FIGS. 2a, 2b relative the outer die during a forming method;

FIG. 4a-4d schematically show cross-sectional views of the forming apparatus of FIGS. 2a, 2b at successive stages of a forming method;

FIGS. 5a and 5b schematically show expanded cross-sectional views of an interface between the inner punch and the outer die of the forming apparatus of FIGS. 2a, 2b to compress a waste portion of a dough;

FIGS. 6a and 6b schematically show expanded cross-sectional views of an interface between an inner punch and an outer die of a further example forming apparatus to cut a waste portion of a dough;

FIG. 7 schematically shows a forming apparatus for forming a plurality of containers;

FIG. 8 schematically shows an example biodegradable container;

Figure 13:
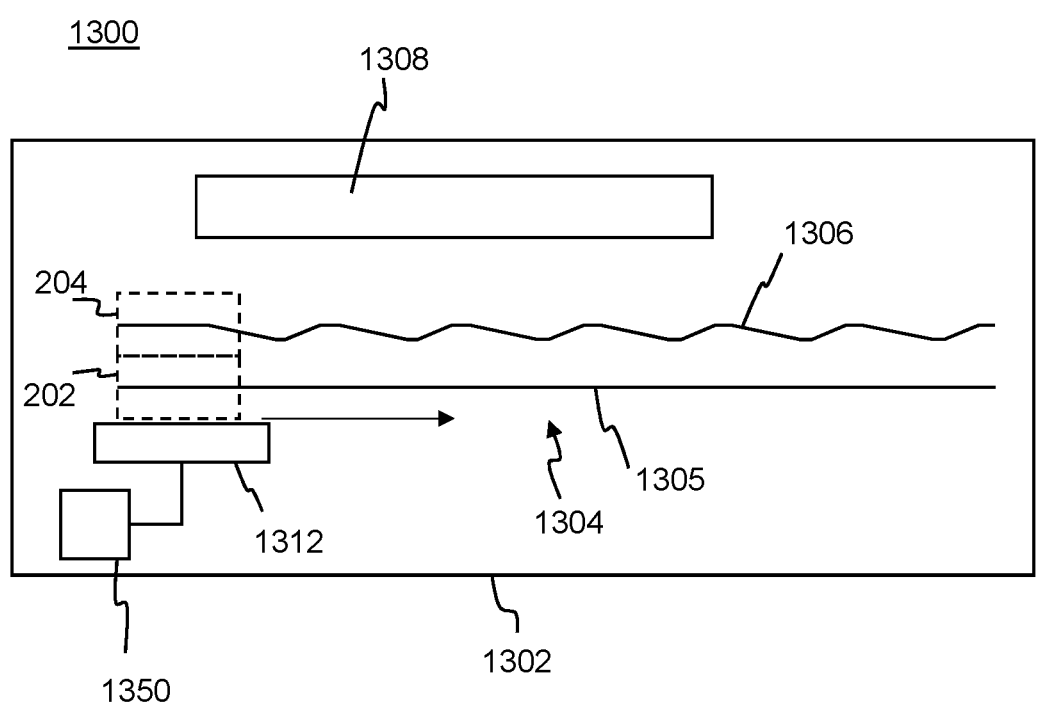

FIGS. 11 and 12 schematically show cross-sectional views of a further example of forming apparatus; and FIG. 13 schematically shows a forming apparatus comprising a tunnel oven.

FIGS. 2a-2b schematically shows a mould assembly 200 for forming a biodegradable container from a dough, in particular a biodegradable cup such as a coffee cup, which may be edible. The mould assembly comprises two opposing mould parts, in particular an outer die 202 which defines an outer forming surface 206 for the container (i.e. it has a surface which in use defines the outer surface of a container formed against it) and an inner punch 204 configured to be received within the outer die and defining an inner forming surface 208 for the container (i.e. it has a surface which in use defines the inner surface of a container formed against it). The outer die 202 and inner punch 204 may be made of any suitable material, for example they may comprise steel.

FIG. 2b shows the mould assembly 200 in a forming configuration in which the outer and inner forming surfaces 206, 208 oppose one another to define a container wall volume 214 between them corresponding to a shape of a wall of a formed container (i.e. the desired shape of a container to be formed using the mould assembly). In this particular example, the container wall volume 214 corresponds to the shape of a cup, such as a coffee cup, having a base and a conical side extending from the base and terminating at an annular rim. In this example, the mould assembly 200 is configured so that the forming configuration corresponds to a maximum insertion of the inner punch 204 into the outer die 202, which may be determined by abutment of cooperating features on the outer die and the inner punch or support structures to which they are attached.

FIG. 2a shows the mould assembly 200 in an open configuration in which the outer and inner forming surfaces 206, 208 are spaced apart more than in the forming configuration, for example by virtue of the inner punch 204 being partially withdrawn from the outer die 202. The open configuration refers to the state of the inner punch 204 and the outer die 202 being separated away from the forming configuration, and there may be a plurality or a continuum of different relative positions which the outer die and the inner punch may adopt whilst being in the open configuration. There may be relative linear movement of between 2-30 cms between the forming configuration and the open configuration, for example 5-15 cms or 5-10 cms.

The mould assembly comprises a heater configured to heat the mould assembly so as to transfer heat to dough received therein in use. For example, the mould assembly or parts of it may be heated to a temperature of 140-180° C. for forming and baking the dough. In this particular example, the heater comprises a first heating element 210 thermally coupled to the outer die 202 and a second heating element 212 thermally coupled to the inner punch 204. For example, the heating elements may be an electric heater (e.g. a resistive heater) mounted on, in or coupled to portions of the outer die 202 and/or inner punch 204 respectively, or other types of heating element such as gas burner heating elements. In some examples, the heater may or be part of comprise a heat transfer loop configured to convey a hot fluid (e.g. water, steam or an oil, amongst others) over or through one or both of the outer die 202 and the inner punch 204.

In preparation for use of the mould assembly in a forming method, the heater preheats the mould assembly ready to transfer heat from the mould assembly to a dough received in the mould assembly. Such heating may continue during the forming method.

In use in a forming method, a dough (for example an edible dough) is placed in the mould assembly 200 between the outer die 202 and the inner punch 204 whilst in the open configuration. The dough is heated by heat transfer from the mould assembly. The dough is a wet dough configured to expand as it is heated and to harden as baking is completed. The forming method includes performing a plurality of successive press forming operations to shape the dough as it expands. Each press forming operation comprises relative movement between the outer die 202 and the inner punch 204 from the open configuration to the forming configuration to shape the dough. The dough expands between successive press forming operations to fill the container wall volume. For example, the dough may progressively expand such that in a first press forming operation, the dough only occupies a sub-portion of the container wall volume, but by the time of a subsequent (not necessarily the immediately following) press forming operation, the dough has expanded to fill and extend beyond the container wall volume. The dough gradually hardens as heating continues to form a baked container having a shape corresponding to the container wall volume.

By performing a plurality of press forming operations such that the inner punch and the outer die separate and move together multiple times, the forming method avoids risk of excessive build-up of pressure between the inner punch and the outer die, and thereby avoids a requirement to exert a commensurately high closing force on the mould assembly to resist such pressure or an explosion. In this particular example, pressure build-up is avoided by two mechanisms. Firstly, the mould assembly is provided with a vent to permit vaporised gases to leave the container wall volume when the mould assembly forming configuration. Accordingly, the mould assembly does not seal the container wall volume in the forming configuration and permits gas to escape. The vent may be provided by a gap between the inner punch and the outer wall, for example at a rim of the container wall volume as will be described in further detail below. Accordingly, pressure build-up owing to vaporisation of water is inhibited as such vapour can escape the container wall volume. The second mechanism is that movement to the open configuration between the press forming operations exposes the dough to ambient pressure. This not only permits the dough to expand (i.e. temporarily beyond the profile of the container wall volume), but it also provides for release of pressure in the event that the vent is blocked, for example by dough. In such a scenario, the dough may have the effect of sealing the container wall volume, even though the mould assembly is not configured to seal the container wall volume in the forming configuration.

In some examples, there may be no such vent as the pressure build-up during any particular forming operation may not be excessive.

Pressure may be exerted on the dough in the forming configuration by virtue of the dough expanding between the forming surfaces, such that it acts between the outer die and inner punch and reacts the weight of one part of the mould assembly (for example, when the inner punch is held in the forming configuration under its own weight and/or that of its support structure). The applicant has found that pressure arising from this mechanical reaction (i.e. separate from any pressure owing to vaporisation if the container wall volume is sealed) may be maintained at a relatively low level whilst achieving acceptable forming of the container, for example below 1 MPa, more preferably no more than 0.5 Mpa, or no more than 0.2 MPa. Similarly, by using multiple press-forming operations with the mould assembly in the forming configuration for a relatively short time, any pressure build up that may transiently occur owing to vaporisation (for example when the container wall volume is sealed by its configuration or by dough blockage) may be kept relatively low such as below 1 MPa, more preferably no more than 0.5 Mpa, or no more than 0.2 MPa. In examples when the mould assembly is held in the forming configuration by the weight of one of its parts, it will be appreciated that any pressure build-up owing to vaporisation is in any case effectively capped at a pressure corresponding to reacting the weight, which for example may be below 1 MPa, more preferably no more than 0.5 Mpa, or no more than 0.2 MPa as set out above.

FIG. 3 is a plot showing the position of the inner punch 204 relative the outer die 202 during a forming method comprising six successive press forming operations (in other examples, there may be fewer or more press forming operations). The upper position along the Y-axis represents the open configuration, and the lower position (intercepting the X-axis) represents the forming configuration. In this particular example, the press forming method comprises six press sequences, each comprising: a respective press forming operation to reach the forming configuration; a resting operation in which the mould assembly remains in the forming configuration for a resting period; a return operation in which the mould assembly returns to the open configuration; and optionally a wait operation in which the mould assembly remains in the open configuration for a wait period. The timing of the various operations in the press sequence may be varied according to any particular mould assembly and dough. For example, the resting period may be relatively shorter for doughs which tend to expand quickly. Substantially all of the press forming operation, return operation and any wait operation correspond to the inner mould being separated from the dough such that there is no interaction between them. Any of the press forming method, press sequence and press forming operation may be controlled by a controller associated with the mould assembly, for example a controller 750 as described below with respect to FIG. 7.

The applicant has found that a advantageously fast press sequence for efficient manufacture can be performed without experiencing excess pressure build up when the resting period is less than an interval between successive resting periods (i.e. the total period for the return operation, any wait operation, and the next press operation). The applicant has similarly found that an advantageously fast press sequence for efficient manufacture can be performed without experiencing excess pressure build up when the resting period is no more than 50% of a total time period for the respective press sequence, for example no more than 30% or no more than 20%. For example, the resting period may be no more than 4 s, for example no more than 2 s, or no more than 1 s. A total time period for the respective press sequence may be 3-15 seconds, for example approximately 3-10 seconds or approximately 5 seconds.

Further, the applicant has found that an advantageously fast baking process can be performed when there are multiple press forming operations and multiple press sequences, when the duration of the resting periods between press forming operations reduces during the course of the baking process. In particular, the applicant has found that heat transfer to the dough is faster when the inner punch is in contact with the dough (i.e. in the resting period), and thereby the dough tends to bake faster. Further, the applicant has found that a rate of vaporisation and the corresponding need to release vapour is more critical during the later stages of a baking operation. It is thought that this may be due to the temperature of the dough being closer to the saturation temperature at later stages of a baking operation such that water is more readily vaporised. Accordingly, the applicant has found that it can be advantageous to provide for longer resting periods during earlier stages of a baking operation, and shorter resting periods towards later stages of a baking operation. For example, a later resting period may be 75% or less, for example 50% or less than the earlier resting period. Over a plurality of such resting periods, the duration of the resting period may progressively reduce.

Figure 1:
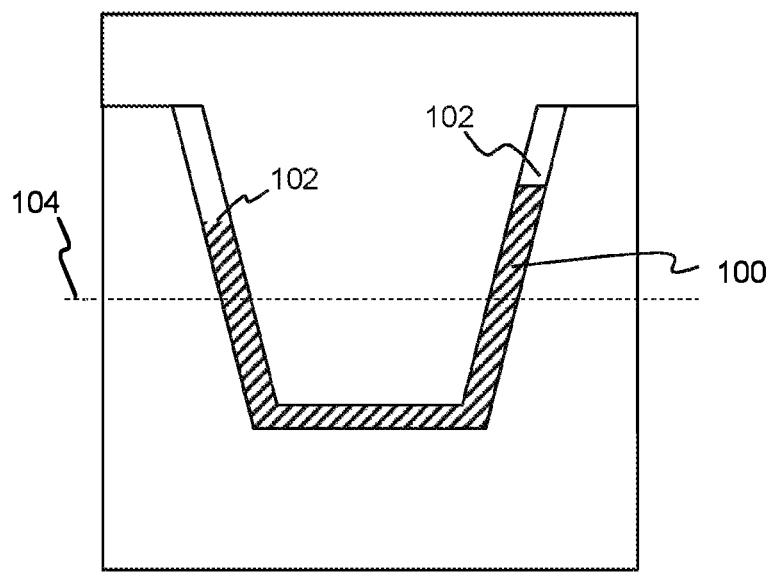
Figure 4A:
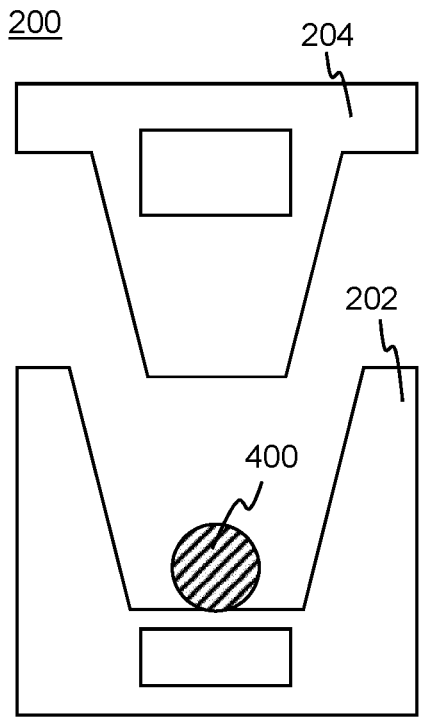

The example forming method will now be described in further detail with reference to FIGS. 4a-4b to illustrate how the dough is permitted to expand as it is heated. FIG. 4a shows initial reception of a dough 400 between the outer die and the inner punch. In this example the mould assembly is held in a configuration such that the base of a recess in the outer die is the lowest point between the die and the punch, such that the dough tends to rest on the base of the outer die 202.

Figure 4B:
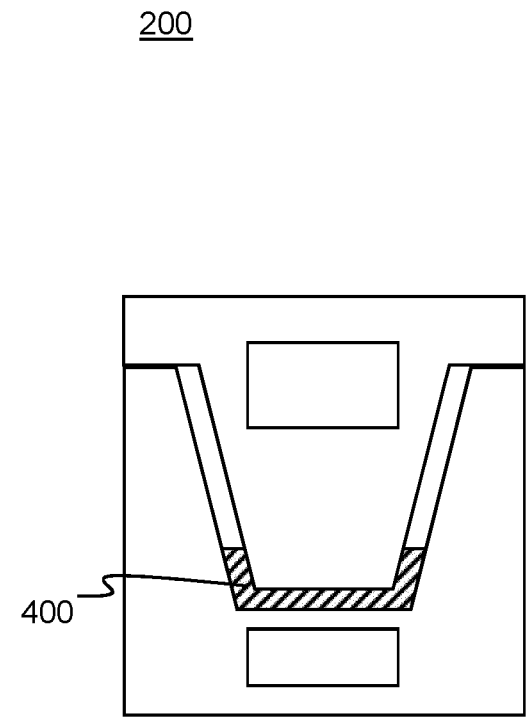

In a first press forming operation, there is relative movement to the forming configuration so that the dough 400 is pressed between the outer and inner forming surfaces 206, 208 of the outer die 202 and the inner punch 204, such that it is caused to conform to the shapes of the forming surfaces 206, 208, as shown in FIG. 4b. The dough 400 is still relatively small such that it occupies a sub-portion of the container wall volume 214 (the dough is indicated in diagonal hatching in FIG. 4b).

Figure 4C:
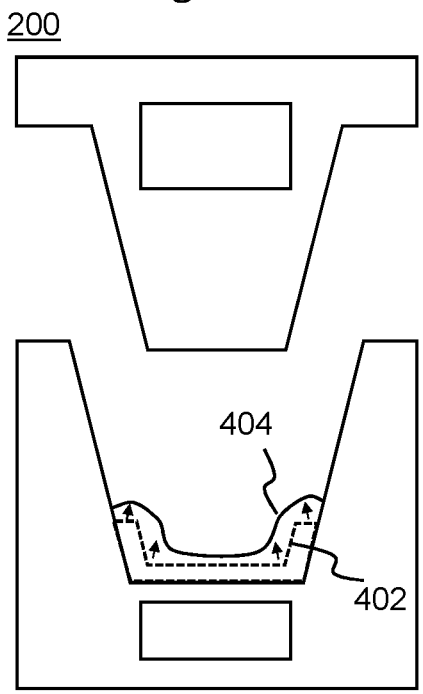

After the resting period, the return operation causes relative movement of the outer die 202 and the inner punch 204 so that the inner punch 204 is separated from the dough 400. The dough 400 continues to expand as it is heated. Such expansion is constrained to follow the outer forming surface 206 of the outer die with which it remains in contact, but is unconstrained on the inner surface of the dough 402 such that the inner surface of the dough may adopt a profile 404 beyond the bounds of the container wall volume 214, as shown in FIG. 4c.

Figure 4D:
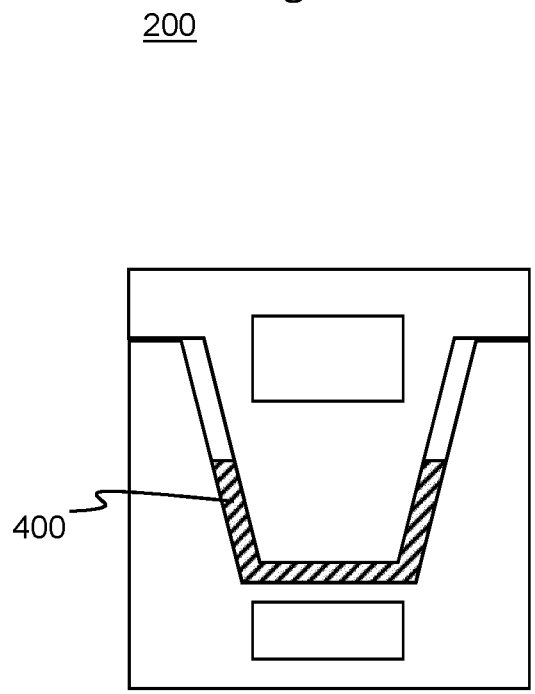

As the following press forming operation is conducted, the inner punch 204 once again engages the dough to press it between the forming surfaces 206, 208 so that it conforms to the shapes of the forming surfaces 206, 208, as shown in FIG. 4d.

Between successive press forming operations, the dough is permitted to expand as it is heated, such that it progressively expands to fill the container wall volume, as is evident by comparing the height of the dough in the container wall volume in FIGS. 4b and 4d.

In this particular example, the inner forming surface 208 is substantially smooth in a longitudinal direction so as to be free of retaining features such as circumferentially-extending recesses or ridges which are recessed from or project into the container wall volume respectively. In some previously-considered mould assemblies, such as those described in BG2894U1, such retaining features may be provided on an inner forming surface to provide an interlock with a baked container such that the container is initially retained on the respective element after baking. As will be described below, the mould assembly is configured for removal of the inner punch 204 from a baked container without retaining it, and for the baked container to be removed by separation of two parts forming the outer die 202. However, in other examples, the inner forming surface may comprise such retaining features.

In this particular example, the inner forming surface 208 and the outer forming surface 206 are substantially smooth in a circumferential direction so as to be free of longitudinally-extending channels (i.e. channels that lie in a plane intersecting a central longitudinal axis of the surface, for example the central axis of a conical or cylindrical portion of the surface). In some previously-considered mould assemblies, such as those described in BG2894U1, such channels may be provided to permit vapour from the dough to escape during forming in the closed mould. However, the applicant has found that such channels may easily become blocked or may otherwise inadequately transport vapour from the dough.

In some examples, recesses or ridges may be provided on either or both forming surfaces for decorative effect.

The amount of dough placed in the mould is selected so that the dough will expand to fill the container wall volume. There may be sufficient dough that the dough is capable of expanding beyond the container wall volume, as will now be described with reference to FIGS. 5a and 5b.

Figures 5A, 5B:
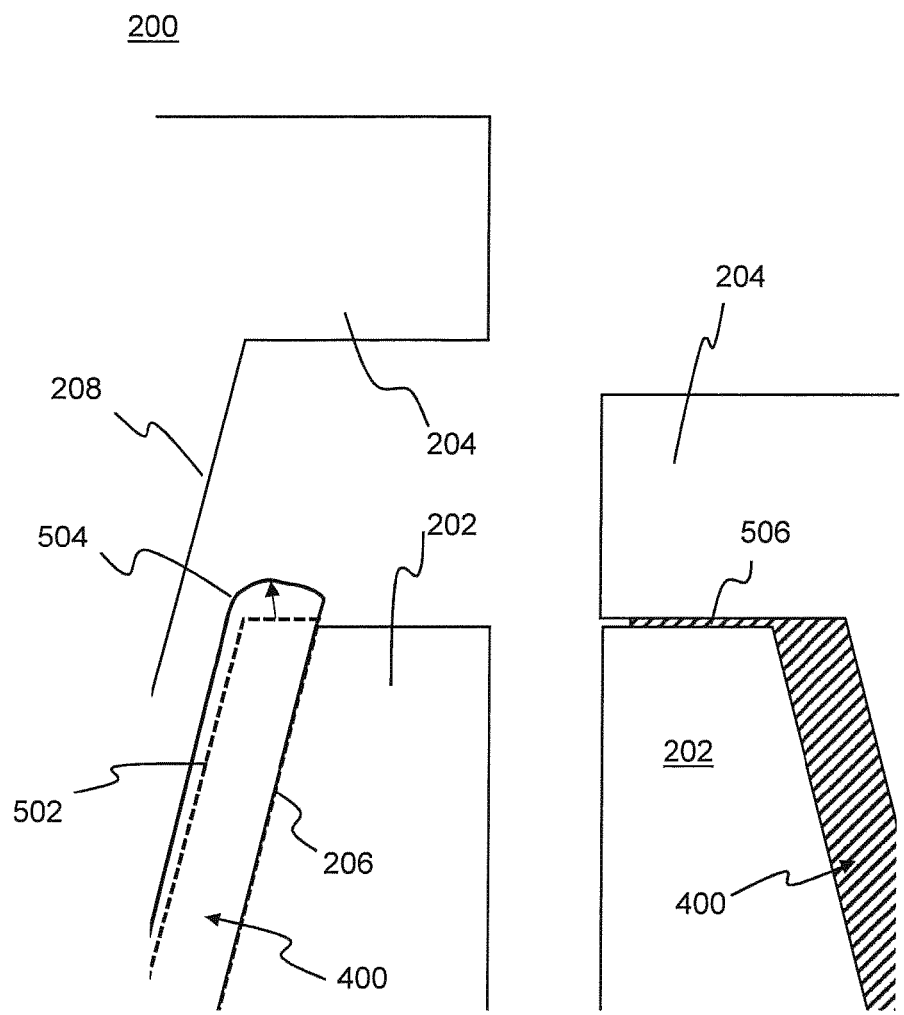

FIG. 5a shows a partial cross-sectional view of a portion of the mould assembly towards the rim of the container wall volume during a forming method, with the mould assembly in the open configuration. At this stage of the forming method, the dough 400 has grown to fill the container wall volume. With the mould assembly in the open configuration, the dough 400 may expand so that its inner surfaces moves from having a profile 502 corresponding to the boundary of the container wall volume (dashed lines in FIG. 5a) to an enlarged profile 504 which extends radially inwardly and upwardly. Upon subsequent pressing in the next forming operation, a waste portion of the dough is caused to pass through a gap between the outer die and the inner punch at the rim, in this particular example an annular gap extending from an outer perimeter of the rim radially outwardly. The gap may be referred to as a clearance.

As shown in FIG. 5b, the outer die 202 and the inner punch 204 are configured to cooperate so that, in the forming configuration, the thickness of the gap is less than a minimum thickness of the container wall volume 214 defined between them for forming the cup. Accordingly, the waste portion 506 of the dough 400 that is forced into the gap is compressed to become relative thin, so as to form "flash" or "flashing" after baking (i.e. excess forming material attached to a product after forming). Such flash may be easily removed after baking as there is a natural weak point at the junction between the flash 506 and the rim of the wall of the container, for example by brushing it away, or passing the baked container through an aperture sized to correspond to the rim so that the flash is deflected away from the container.

Figure 6A:
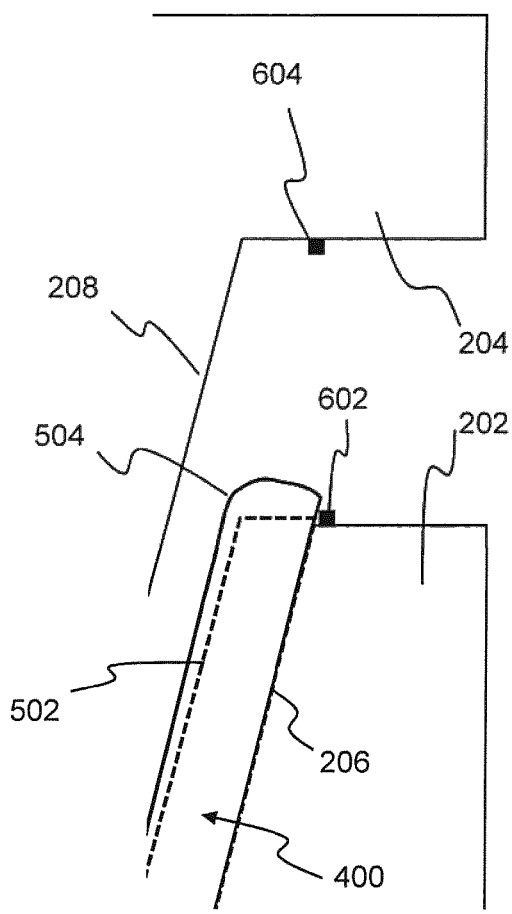
Figure 6B:
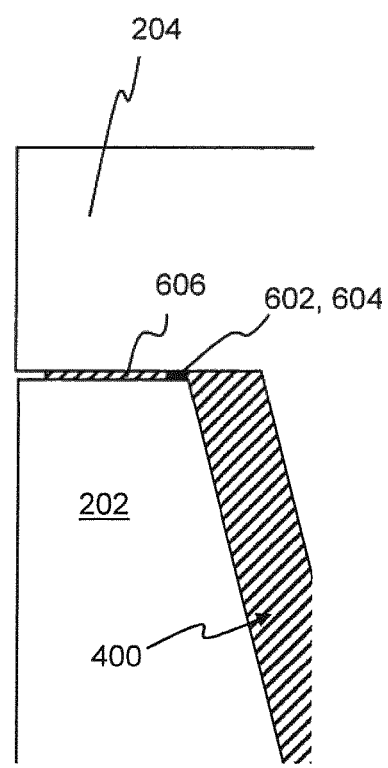

FIGS. 6a and 6b show an alternative example mould assembly 600 which differs from the mould assembly 200 described above with respect to FIGS. 2 and 4-5 only in that the outer die 202 and the inner punch 204 are configured to remove the waste that extends through the gap at the rim by cooperating portions of the inner punch 204 and the outer die 202 which cooperate to cut the waste portion 606 from the dough 400. In this particular example, there are cooperating annular formations 602, 604 on the outer die and inner punch respectively, such as cutting elements, located adjacent the portions of the outer and inner forming surfaces which define the rim. In other example, there may be only one such cutting element configured to cooperate with a plain or recessed surface of the opposing part (i.e. anvil cutting).

Figure 7:
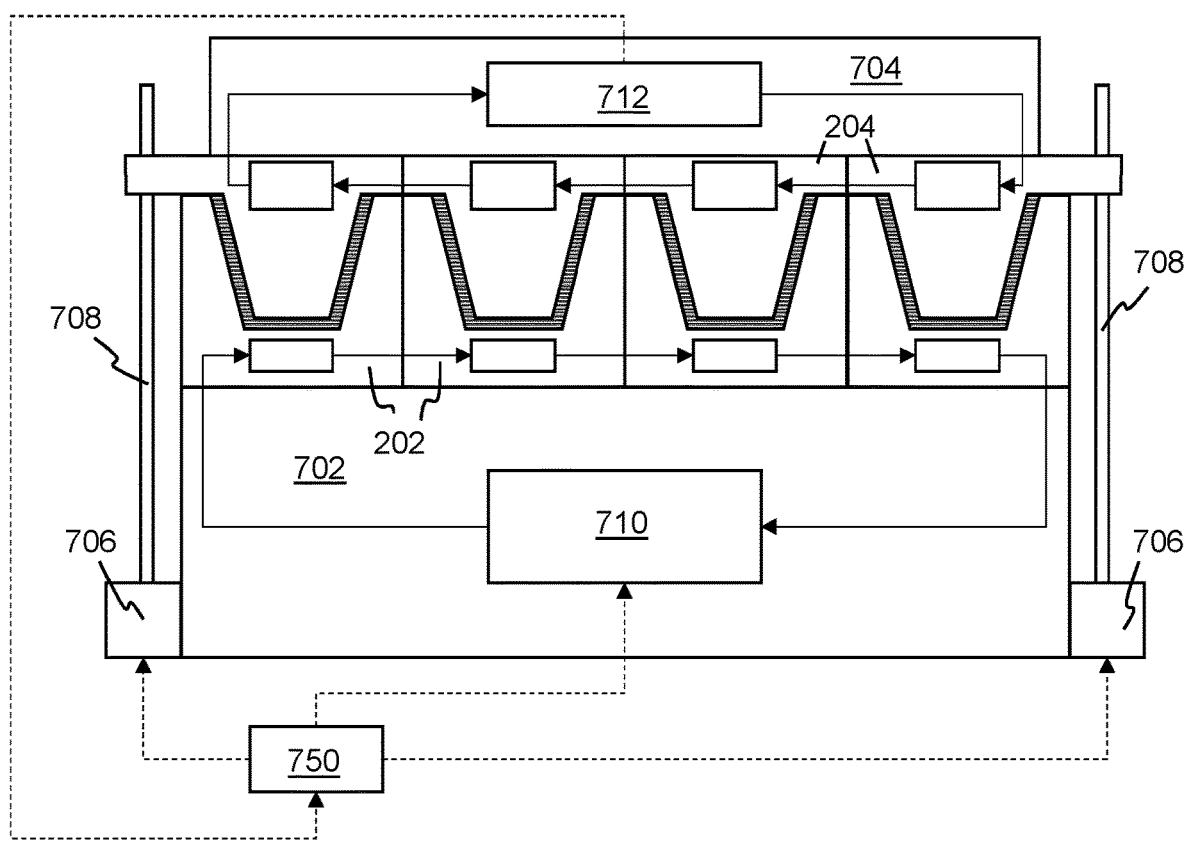

FIG. 7 shows an example forming apparatus 700 configured to form a plurality of containers simultaneously. The forming apparatus comprises a die body 702 which supports a plurality of outer dies 202 as described above with respect to FIGS. 2 and 3-5, and a punch body 704 which supports a plurality of inner punches 204 as described above with respect to FIGS. 2 and 3-5. The die body and/or the punch body may be a unitary body comprising integrally formed outer dies/inner punches, or may be an assembly of individual outer dies/inner punches.

By way of example, there is a compound heater configured to heat the outer dies 202 by passing a heat exchange fluid through heating elements in each of the outer dies 202. For example, as shown in FIG. 7, the die body 702 may comprise a circulator 710 configured to receive a heating fluid from an external connection (either under motive force of the heating fluid or by active circulation using a pump of the circulator 710) and circulate the heating fluid through heating elements 210 (as described with respect to FIG. 2) proximate the individual outer forming surfaces 206 of the outer dies 202. The circulator 710 may receive the heating fluid from the individual heating elements and discharge this externally of the die body 702. In other examples, the circulator 710 may circulate the heating fluid in a closed loop, and may comprise a heat exchanger configured to re-heat the heating fluid received from the outer dies 202.

As shown in FIG. 7, in this example there is a corresponding fluid heating arrangement for the punch body in which a circulator 712 causes heated fluid to pass through heating elements proximate the individual inner forming surfaces 208 of the inner punches 204.

The die body 702 is mounted on a structural support, and the punch body is suspended on a moveable carrier to effect movement from the open configuration to the forming configuration. In this particular example, the moveable carrier comprises a set of support rails (e.g. at corners of the punch body) which are fixed with respect to the die body and moveable with respect to respective actuators 706 that are fixed with respect to the structural support. However, as will be appreciated there are many standard support arrangements which may be used to support the die body 702 and the punch body 704 so as to cause relative movement between them.

The forming apparatus comprises a controller 750, for example a PLC or a computer, configured to control operation of the forming apparatus. In this example, the controller 750 is functionally coupled with the actuators 706 to control relative movement between the open configuration and the forming configuration to execute a forming method comprising a plurality of press sequences as described above. Further, in this example the controller 750 is functionally linked with the circulators 710, 712 forming a heater of the forming apparatus, so as to control heating of the outer dies 202 and the inner punches 204 and thereby the heating of the dough.

The forming apparatus may further comprise a dough placement device configured to automatically place dough in each outer die 202. The skilled person will appreciate that such devices may take any suitable form and may be controllable by the controller 750.

Further, the forming apparatus may be configured to automatically separate a baked container from the mould assembly, for example by retracting the punch body to the open configuration and automatically opening a two-part structure of the die body 702 over a receptacle for the containers. The controller 750 may be configured to control a separation operation in which the baked container is separated from the mould assembly.

The dough may be any suitable dough which is configured to expand during heating so as to fill the container wall. Suitable doughs may have a composition comprising (wt. %): 17% to 40% flour, 20% to 40% oat bran, 0.1% to 0.5% salt, 7% to 10% sugar, 0.1% to 1% alginate, 0.1% to 10% fat, 0.1% to 7% gluten, 0.7% to 10% stabilizer, 1% to 15% flavouring or spices and at least 15% water (which may comprise the remainder to 100% weight, for example 20-40%). Suitable dough compositions are disclosed in BG2170U1 and BG2824U1. It will be understood by the skilled person that variations in the composition of the dough are reflected in variations in the expansion profile and baking rate of the dough, and that the number and parameters of the press sequences may be adjusted accordingly to cause suitable expansion and baking of the dough.

Figure 8:
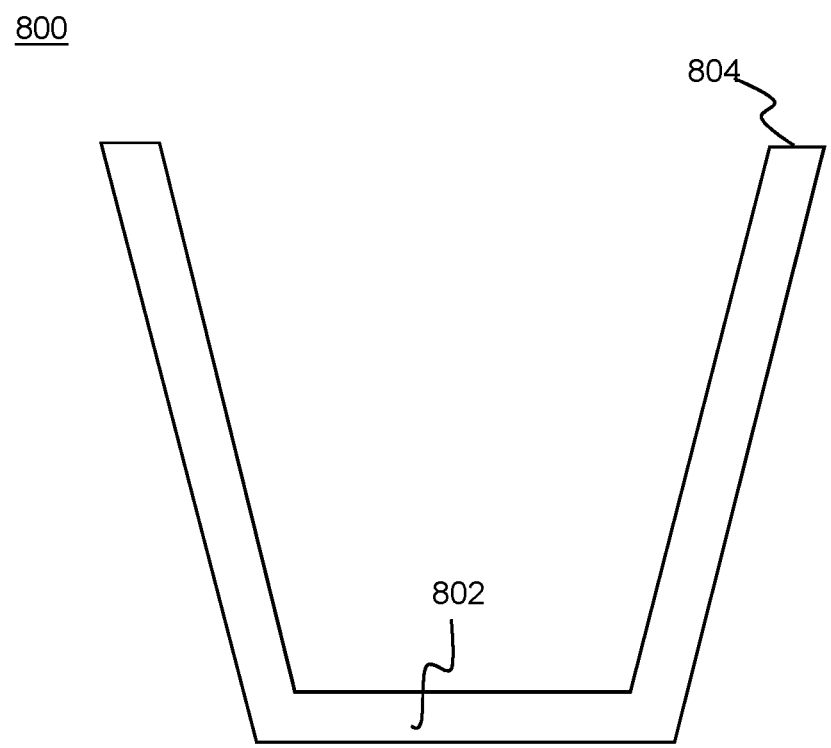

FIG. 8 shows an example container 800 formed by a forming method as described above. In this particular example, the container 800 is a cup comprising a base 802 and a conical side wall terminating at a rim 804. Whilst previously-considered methods require the wall of a formed container to be trimmed to achieve a level rim, the forming methods described herein enable the reliable manufacture of a container having a rim of uniform height defined by one of the forming surfaces (in this example, the inner forming surface of the inner punch). Containers manufactured by previously-considered methods have generally smooth wall surfaces and a rough rim surface owing to the trimming performed to define the rim. In contrast, containers manufactured by the methods described herein with respect to FIGS. 2-7 have a smooth surface at the rim. The roughness of the surface at the rim is substantially equal to the roughness of the wall surface. For example, a roughness parameter $R_a$ evaluated at the rim 84 (by any suitable means) may differ from a roughness parameter evaluated at the inner surface of the container or the outer surface of the container by no more than 30%, for example no more than 15% or no more than 5%.

Figure 9:
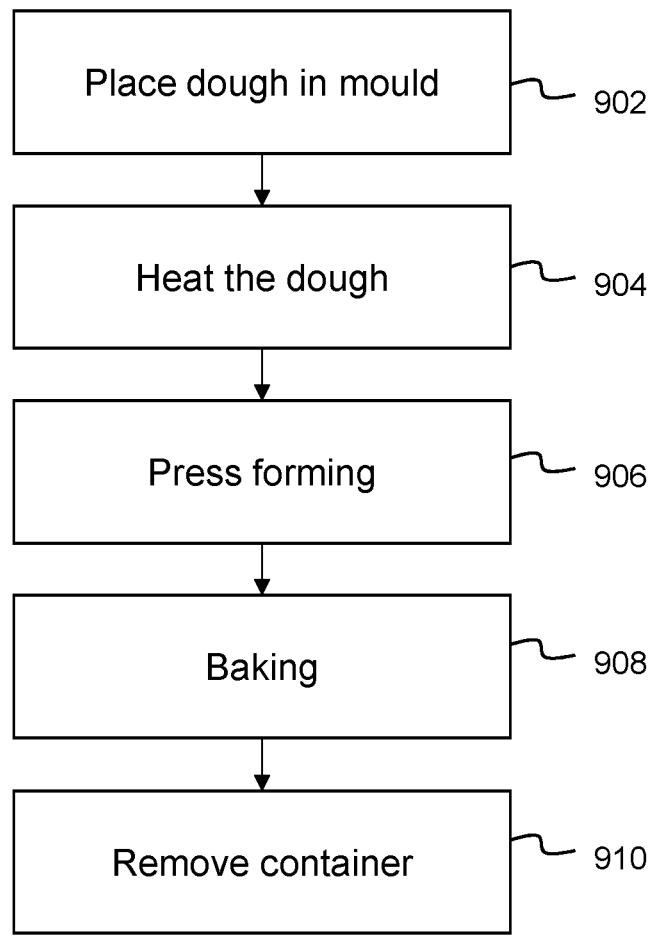
FIG. 9 is a flow diagram of a forming method.

FIG. 9 is a flow diagram of a forming method as described herein, and will be described with reference to the forming apparatus of FIG. 7. The description is with respect to forming one container, but it will be appreciated that multiple containers may be formed simultaneously using a forming apparatus such as that of FIG. 7. In block 902 a dough is placed in a mould assembly comprising an opposing outer die and inner punch. This may be done manually or by a dough placement device controlled by the controller 750 as described above. In block 904 the dough is heated by heat transfer from the mould assembly as described above with respect to FIGS. 2, 4 and 7. In block 906 a plurality of successive press forming operations are conducted to shape the dough to conform to the wall container volume 214 (defined by the opposing outer and inner forming surfaces 206, 208 of the outer die 202 and the inner punch 204 respectively). The press forming operation, together with any press forming sequence and forming method (as described above with respect to FIGS. 3-6) may be controlled by the controller 750 according to predetermined instructions.

In block 908, after completion of the or each press forming operation and/or press forming sequence, the dough is baked within the mould assembly during a baking period. An example duration of the baking period is between 30 s and 4 m, for example 3m. IN some examples, there may be no separate baking period and the dough may be baked as press forming operations continue to be periodically conducted. The dough may be baked at a higher temperature during the baking period than during the press forming operation/press forming sequences—for example by heating the mould assembly to a higher temperature.

In block 910 the container is removed from the forming apparatus, for example by moving the forming apparatus to the open configuration and opening a two-part structure of the die block to permit the containers to fall from the forming apparatus into a receptacle. The controller 750 may cause the container to be removed, for example by controlling opening of the two-part structure of the die block over the receptacle.

Figure 10:
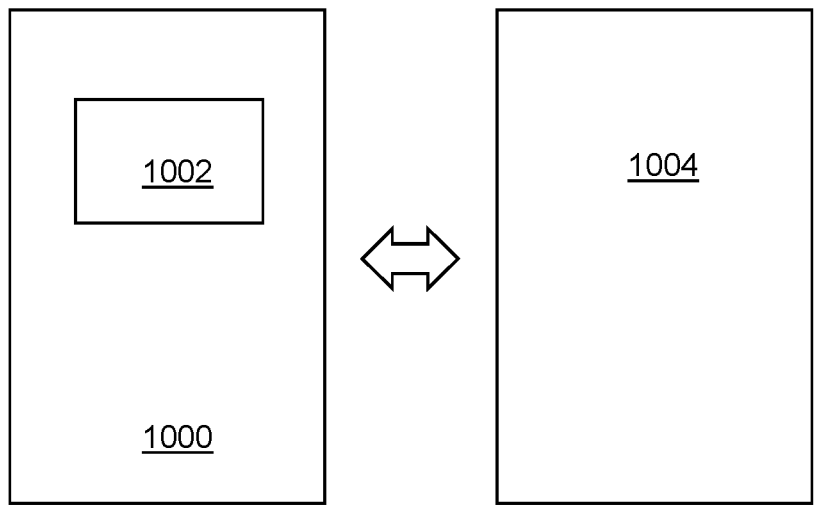
FIG. 10 shows a computer-readable medium and a processor.

The controller may comprise a non-transitory machine-readable storage medium, such as a memory (e.g. a hard disk such or a solid-state disk), comprising instructions for controlling a forming method as described herein when executed by a processor (for example a processor of the controller). FIG. 10 shows such a machine readable medium 1000 comprising instructions 1002 for execution by a processor 1004. The instructions may be provided as a computer program.

FIGS. 11 and 12 show cross-sectional views of an example forming apparatus 1100 which is similar to the forming apparatus 200 of FIG. 5 but differs by the provision of waste cavities for receiving a waste portion of dough that expands beyond the rim. In previously described examples a gap is formed at the rim between the outer die and the outer punch that permits a radially-extending flow of waste dough from the rim. In contrast, in this example one or more waste cavities 1102 are formed in the inner punch above the rim.

Figures 11A, 11B:
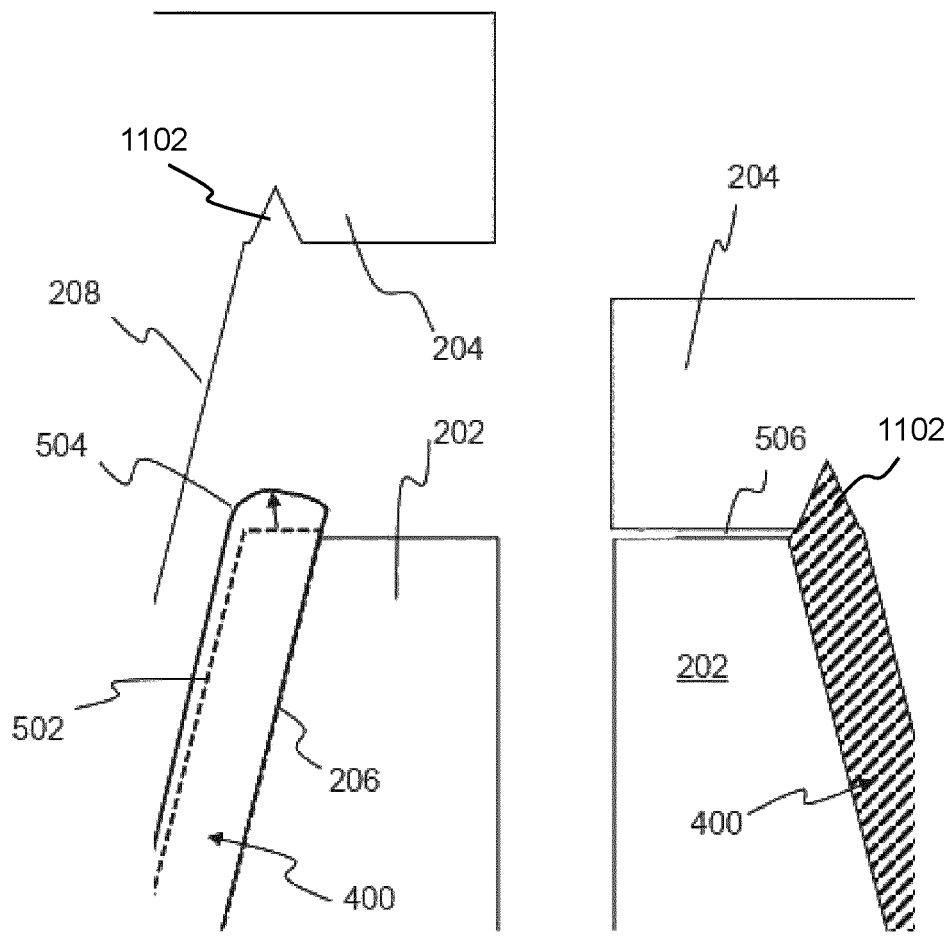

In this example, there are a plurality of waste cavities 1102 angularly-spaced apart from one another in the form of recesses in a wall of the inner punch which defines the rim of the container wall volume. As shown in FIGS. 11*a* and 11*b*, in this example the waste cavities have a substantially triangular cross-section, but this may take any suitable form.

Figure 11C:
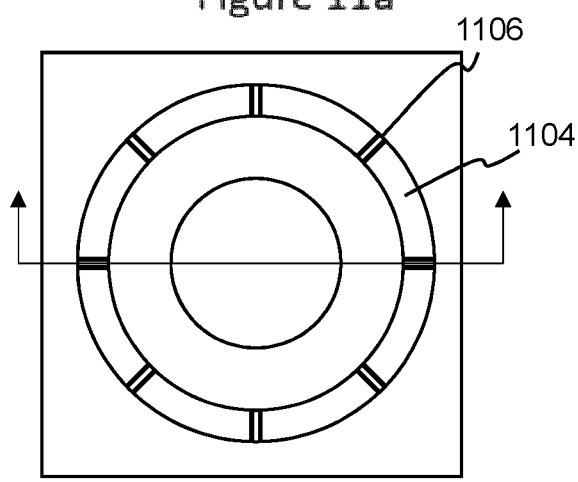

FIGS. 11*c* and 12*c* show a lateral cross-section of the mould assembly at a location corresponding to the rim with the mould assembly in the forming configuration. As shown, there is a plurality of gaps 1106 at the rim formed between elements 1104.

As indicated by FIGS. 11*c* and 12*c* respectively, the cross-section of FIGS. 11*a* and 11*b* intersects a waste cavity, whereas the cross-section of FIGS. 12*a* and 12*b* does not intersect a waste cavity.

The gaps 1106 at the rim which permit flow of the dough to the waste cavities may be formed in various ways. In some examples, the gaps 1106 at the rim may simply be the openings of the waste cavities in the respective surface of the inner punch 204, such that that surface alternately defines a portion of the rim and an opening of a waste cavity. The openings may be narrow such that in a formed container, there is a natural weak point between any waste portion projecting above the rim and the substantially planar portions of the rim either side, such that the waste portions may be easily brushed off to remove them from the formed container.

However, in the particular example shown in FIGS. 11 and 12, the gaps 1106 are formed between a cap 1104 coupled to or integral with the outer die. The cap 1104 has a plurality of cap elements that extend radially-inwardly from the radially-outer wall of the container wall cavity to define the rim of the container way volume. In other examples, there may be a unitary cap element with gaps formed therein. There may be any suitable number of waste cavities, for example 8 (as shown) or more.

In use in a forming operation, the inner punch is moved to the forming configuration as described above, so as to act on and deform the expanded dough. This may cause dough to project through the gaps to enter one or more waste cavities 1102, as shown in FIG. 11*b*.

At angular positions between the waste cavities, the dough is constrained by the cap 1104 which defines a substantially profile of the rim (excluding gaps for waste portions of the dough), as shown in FIG. 12.

As shown in FIG. 12*a*, dough may expand when the mould assembly is in the open configuration such that a portion of the dough extends beyond a radially-inner lip of the cap 1104. Subsequent movement of the mould assembly to the forming configuration causes any such portion to either be compressed between the inner punch and the outer die (in particular, between the inner punch and the opposing surface of the cap 1104). The cap 1104 may be configured to cooperate at its radially-inner edge with the inner punch so as to cut such a projecting portion of dough.

FIG. 13 shows a further example forming apparatus 1300 which may include any of the features of the forming apparatuses described elsewhere herein, for example with respect to FIGS. 2-12.

In this example, the forming apparatus 1300 comprises a tunnel oven 1302 in which a mould assembly comprising one or more outer dies 204 and one or more inner punches 204 as described above is received.

The forming apparatus 1300 comprises mechanical guide equipment which defines a guide path 1304 for conveying the mould assembly through the tunnel oven. The guide path determines (i.e. defines) relative movement between the outer die and the inner punch as a function of position of the mould assembly along the guide path. In this example, the forming apparatus 1300 comprises a controller 1350 which is configured to control movement of the mould assembly along the guide path 1304, for example by controlling a linear actuator 1312 configured to convey the mould assembly along the guide path.

By controlling movement along the guide path, the controller causes performance of a plurality of press forming operations (and any plurality of press sequences) as described herein.

In this particular example, the guide path is defined by a rail 1306 having a profile corresponding to the relative movement of the outer die and the inner punch between the open configuration and the forming configuration. As shown schematically in FIG. 12, the rail 1306 has a variable profile corresponding to the displacement of the inner punch relative to the outer die during the press forming operations. In this example, the height of the outer die remains constant as it slides on a straight rail 1305, whereas the height of the inner punch varies as it slides on the profiled rail 1306. In other examples, either one or both of the die and punch may be received on a profiled rail or equivalent actuation structure.

A timing of a press forming operation or press sequence may be varied by varying a linear speed of the mould assembly along the guide path 1304. In this way, a predetermined transient profile of the relative separation of the outer die and the inner punch may be achieved, which differs from any transient profile corresponding to constant speed of movement. This may permit, for example, the duration of a resting period in the forming configuration to be varied relative the duration of other periods in a press sequence, without changing the physical configuration of the guide equipment.

Whilst particular examples have been described with respect to a container which is a cup, such as a coffee cup, it will be appreciated that the method and apparatus of the disclosure is equally applicable to form other containers, such as bowls, boxes, trays, plates and the like.

Whilst particular examples have been described in which a controller is provided in conjunction with a multi-container forming apparatus, it will be appreciated that such a controller may be provided for a forming apparatus comprising a mould assembly configured to form a single container.

For the avoidance of doubt, the disclosure extends to the subject-matter of the following numbered paragraphs, or "Paras":

Para 1. A method of forming a biodegradable container, such as a cup, comprising:
providing a mould assembly comprising an outer die and an inner punch, the outer die defining an outer forming surface for the container and the inner punch defining an inner forming surface for the container, the mould assembly having a forming configuration in which the outer and inner forming surfaces oppose one another to define a container wall volume corresponding to a formed shape of a wall of the container, and an open configuration in which the outer and inner forming surfaces are spaced apart more than in the forming configuration;
placing a dough in the mould assembly between the outer die and the inner punch;
heating the dough by heat transfer through the mould assembly to cause the dough to expand and bake;
performing a plurality of successive press forming operations, each press forming operation comprising relative movement between the outer die and the inner punch from the open configuration to the forming configuration to shape the dough as it expands;

wherein the dough expands between at least two successive press forming operations to fill the container wall volume, before baking is completed to provide the container.

Para 2. A method according to Para 1, wherein the container wall volume terminates at a rim defined by cooperation between the inner punch and the outer die in the forming configuration, the rim corresponding to a rim of the container.

Para 3. A method according to Para 2, wherein a waste portion of the dough flows through a gap at the rim; the method further comprising removing the waste portion from the container.

Para 4. A method according to Para 3, wherein the dough expands between the at least two successive press forming operations to fill and expand beyond the container wall volume while the inner punch is separated from the dough in the open configuration, before baking is completed to provide the container; and wherein the plurality of press forming operations include:
   a first press forming operation in which the dough occupies a sub-portion of the container wall volume with the mould assembly in the forming configuration; and
   a subsequent forming operation in which a waste portion of dough expanding beyond the container wall volume is caused to pass through a gap at the rim;
wherein the gap is defined between the inner punch and the outer die in the forming configuration.

Para 5. A method according to Para 3 or 4, wherein the mould assembly comprises one or more waste cavities for receiving the waste portion.

Para 6. A method according to Para 5, wherein a plurality of waste cavities are formed in the inner punch at angularly-spaced intervals over the rim, so as to receive respective waste portions expanding through the rim.

Para 7. A method according to any of Paras 3-6, wherein the waste portion is removed by cutting between cooperating portions of the inner punch and the outer die.

Para 8. A method according to any of Para 3-7, wherein the gap is defined between the inner punch and the outer die in the forming configuration, and the method comprises compressing the waste portion between the inner punch and the outer die to a thickness less than a minimum thickness of the container wall volume.

Para 9. A method according to any of Paras 1-8, wherein the mould assembly remains in the forming configuration between successive press forming operations for a resting period.

Para 10. A method according to Para 9, wherein there is a plurality of resting periods between respective press forming operations, wherein the durations of the resting periods reduce such that an earlier resting period has a greater duration than a later resting period.

Para 11. A method according to Para 9 or 10, wherein the or each resting period is less than an interval between successive resting periods.

Para 12. A method according to any of Paras 1-11, comprising a plurality of press sequences, each comprising:
   a respective one of the press forming operations;
   a rest operation in which the mould assembly remains in the forming configuration for a resting period; and
   a return operation in which the mould assembly returns to the open configuration;

wherein for at least some of the press sequences, the resting period is no more than 30% of a total time period for the press sequence; or
wherein for at least some of the press sequences, the resting period is no more than 2 s.

Para 13. Forming apparatus for manufacturing a biodegradable container, such as a cup, comprising
   a mould assembly comprising an outer die and an inner punch, the outer die defining an outer forming surface for the container and the inner punch defining an inner forming surface for the container, the mould assembly having a forming configuration in which the outer and inner forming surfaces oppose one another to define a container wall volume corresponding to a formed shape of a wall of the container, and an open configuration in which the outer and inner forming surfaces are spaced apart more than in the forming configuration;
   a heater configured to heat one of the outer die and the inner punch to transfer heat from the mould assembly to a dough received in the mould assembly in use;
   a controller configured to control the forming apparatus to perform a plurality of successive press forming operations, each press forming operation comprising relative movement between the outer die and the inner punch from the open configuration to the forming configuration, such that in use a dough received in the mould assembly is shaped as it expands to fill the container wall volume.

Para 14. Forming apparatus according to Para 13, wherein the inner punch and the outer die are configured to cooperate in the forming configuration so as to define a rim of the container wall volume corresponding to a rim of the container, and wherein the mould assembly defines a gap at the rim for flow of a waste portion of dough from the container wall volume.

Para 15. Forming apparatus according to Para 13 or 14, wherein the controller is configured to control the forming apparatus to perform the plurality of successive press forming operations including a first press forming operation and a subsequent press forming operation, such that in use the dough received in the mould assembly is shaped as it progressively expands over the plurality of press forming operations to fill the container wall volume; and
   wherein in the open configuration the dough is permitted to expand beyond the container wall volume while the inner punch is separated from the dough, such that in use a waste portion expanding beyond the container wall volume is caused to pass through the gap at the rim to be removed.

Para 16. Forming apparatus according to any of Paras 13-15, wherein the mould assembly comprises one or more waste cavities for receiving the waste portion.

Para 17. Forming apparatus according to Para 16, wherein a plurality of waste cavities are formed in the inner punch at angularly-spaced intervals over the rim, so as to receive respective waste portions expanding through the rim.

Para 18. Forming apparatus according to any of Paras 13-17, wherein the gap is defined between the inner punch and the outer die in the forming configuration, and wherein the inner punch and the outer die are configured to cooperate to compress a waste portion of dough which flows through the gap to a thickness less than a minimum thickness of the container wall volume, or to cut the waste portion of dough from the container.

Para 19. Forming apparatus according to any of Paras 13-18, wherein the controller is configured to control the forming apparatus to perform a plurality of press forming operations so that there is a plurality of resting periods between respective press forming operations.

Para 20. Forming apparatus according to Para 19, wherein the durations of the resting periods reduce such that an earlier resting period has a greater duration than a later resting period.

Para 21. Forming apparatus according to Para 19 or 20, wherein the or each resting period is less than an interval between successive resting periods.

Para 22. Forming apparatus according to any of Paras 13-21, wherein the controller is configured to control the forming apparatus to perform a plurality of press sequences, each comprising:
- a respective one of the press forming operations;
- a rest operation in which the mould assembly remains in the forming configuration for a resting period; and
- a return operation in which the mould assembly returns to the open configuration;
- wherein for at least some of the press sequences, the resting period is no more than 30% of a total time period for the press sequence; or wherein for at least some of the press sequences, the resting period is no more than 2 s.

Para 23. Forming apparatus according to any of Paras 13-22, wherein the inner forming surface of the inner punch is smooth.

Para 24. Forming apparatus according to any of Paras 13-23, wherein the outer forming surface of the outer die is smooth.

Para 25. Forming apparatus according to any of Paras 13-24, comprising a tunnel oven comprising the heater, and mechanical guide equipment defining a guide path for conveying the mould assembly through the tunnel oven;
- wherein the guide path is configured to determine relative movement between the outer die and the inner punch as a function of a position of the mould assembly along the guide path; and
- wherein the controller is configured to control performance of the plurality of press forming operations by controlling movement of the mould assembly along the guide path.

Para 26. Forming apparatus according to Para 25, wherein the guide path is defined by a rail having a profile corresponding to the relative movement of the outer die and the inner punch between the open configuration and the forming configuration.

Para 27. Forming apparatus according to Para 25 or 26, wherein a relative separation between the outer die and the inner punch during relative movement is a function of a position of the mould assembly along the guide path; and
- wherein the controller is configured to vary a speed of the mould assembly along the guide path to achieve a predetermined transient profile of the relative separation which differs from any transient profile of relative separation corresponding to constant speed of the mould assembly along the guide path.

Para 28. Forming apparatus according to any of Paras 25-27, configured to cause performance of a method in accordance with any of Paras 1-12 by controlling movement along the guide path.

Para 29. A biodegradable container, such as a cup, comprising a baked dough, the container having a wall terminating at a rim, wherein a roughness of one side of the wall is substantially equal to a roughness of the rim.

Para 30. A machine-readable medium comprising instructions that, when executed by a processor, cause performance of a method in accordance with any of Paras 1-12.

Para 31. A computer program comprising instructions that, when executed by a processor, cause performance of a method in accordance with any of Paras 1-12.

The invention claimed is:

1. A method of forming a biodegradable container, comprising:
   providing a mould assembly comprising an outer die and an inner punch, the outer die defining an outer forming surface for the container and the inner punch defining an inner forming surface for the container, the mould assembly having a forming configuration in which the outer and inner forming surfaces oppose one another to define a container wall volume corresponding to a formed shape of a wall of the container, and an open configuration in which the outer and inner forming surfaces are spaced apart more than in the forming configuration, the container wall volume terminating at a mould rim defined by cooperation between the inner punch and the outer die in the forming configuration, the mould rim corresponding to a container rim of the container;
   placing a dough in the mould assembly between the outer die and the inner punch;
   heating the dough by heat transfer through the mould assembly to cause the dough to expand and bake;
   performing a plurality of successive press forming operations, each press forming operation comprising relative movement between the outer die and the inner punch from the open configuration to the forming configuration to shape the dough as the dough expands;
   wherein the dough expands between at least two successive press forming operations to fill and expand beyond the container wall volume while the inner punch is separated from the dough in the open configuration, before baking is completed to provide the container;
   wherein the plurality of press forming operations include:
      a first press forming operation in which the dough occupies a sub-portion of the container wall volume with the mould assembly in the forming configuration; and
      a subsequent forming operation in which a waste portion of dough expanding beyond the container wall volume is caused to pass through a gap at the mould rim and compressed in the gap, which is defined between the inner punch and the outer die in the forming configuration, to a thickness less than a minimum thickness of the container wall volume; and
   removing the waste portion from the container.

2. A method according to claim 1, wherein the mould assembly comprises a plurality of waste cavities for receiving the waste portion, and wherein the plurality of waste cavities are formed in the inner punch at angularly-spaced intervals over the mould rim, so as to receive respective waste portions expanding through the mould rim.

3. A method according to claim 1, wherein the waste portion is removed by cutting between cooperating portions of the inner punch and the outer die.

4. A method according to claim 1, wherein the mould assembly remains in the forming configuration, between at least two successive press forming operations, for a resting period.

5. A method according to claim 4, wherein there is a plurality of resting periods between respective press forming operations, wherein the durations of the resting periods reduce such that an earlier resting period has a greater duration than a later resting period.

6. A method according to claim 4, wherein the duration of each resting period is less than an interval between successive resting periods.

7. A method according to claim 1, comprising a plurality of press sequences, each comprising:
- a respective one of the press forming operations;
- a rest operation in which the mould assembly remains in the forming configuration for a resting period; and
- a return operation in which the mould assembly returns to the open configuration;
- wherein for at least some of the press sequences, the resting period is no more than 30% of a total time period for the press sequence; or
- wherein for at least some of the press sequences, the resting period is no more than 4 s, for example no more than 2 s.

8. A computer program or a non-transitory machine readable medium comprising instructions that, when executed by a processor, cause performance of a method in accordance with claim 1.

9. Forming apparatus for manufacturing a biodegradable container comprising
- a mould assembly comprising an outer die and an inner punch, the outer die defining an outer forming surface for the container and the inner punch defining an inner forming surface for the container, the mould assembly having a forming configuration in which the outer and inner forming surfaces oppose one another to define a container wall volume corresponding to a formed shape of a wall of the container, and an open configuration in which the outer and inner forming surfaces are spaced apart more than in the forming configuration, wherein the inner punch and the outer die are configured to cooperate in the forming configuration so as to define a mould rim of the container wall volume corresponding to a container rim of the container, and wherein the mould assembly defines a gap at the mould rim between the inner punch and the outer die in the forming configuration for flow of a waste portion of dough from the container wall volume;
- a heater configured to heat one of the outer die and the inner punch to transfer heat from the mould assembly to a dough received in the mould assembly in use;
- a controller configured to control the forming apparatus to perform a plurality of successive press forming operations including a first press forming operation and a subsequent press forming operation, each press forming operation comprising relative movement between the outer die and the inner punch from the open configuration to the forming configuration, such that in use a dough received in the mould assembly is shaped as it progressively expands over the plurality of press forming operations to fill the container wall volume,
- wherein in the open configuration the dough is permitted to expand beyond the container wall volume while the inner punch is separated from the dough, such that in use a waste portion expanding beyond the container wall volume is caused to pass through the gap at the mould rim to be removed;
- wherein the inner punch and the outer die are configured to cooperate to compress the waste portion of dough which flows through the gap to a thickness less than a minimum thickness of the container wall volume.

10. Forming apparatus according to claim 9, wherein the mould assembly comprises one or more waste cavities for receiving the waste portion, and wherein a plurality of waste cavities are formed in the inner punch at angularly-spaced intervals over the mould rim, so as to receive respective waste portions expanding through the mould rim.

11. Forming apparatus according to claim 9, wherein the controller is configured to control the forming apparatus so that the mould assembly remains in the forming configuration between successive press forming operations for a resting period.

12. Forming apparatus according to claim 11, wherein the controller is configured to control the forming apparatus to perform a plurality of press forming operations so that there is a plurality of resting periods between respective press forming operations.

13. Forming apparatus according to claim 12, wherein the durations of the resting periods reduce such that an earlier resting period has a greater duration than a later resting period.

14. Forming apparatus according to claim 12, wherein the duration of each resting period is less than an interval between successive resting periods.

15. Forming apparatus according to claim 9, wherein the controller is configured to control the forming apparatus to perform a plurality of press sequences, each comprising:
- a respective one of the press forming operations;
- a rest operation in which the mould assembly remains in the forming configuration for a resting period; and
- a return operation in which the mould assembly returns to the open configuration;
- wherein for at least some of the press sequences, the resting period is no more than 30% of a total time period for the press sequence; or wherein for at least some of the press sequences, the resting period is no more than 4 s, for example no more than 2 s.

16. Forming apparatus according to claim 9, comprising a tunnel oven comprising the heater, and mechanical guide equipment defining a guide path for conveying the mould assembly through the tunnel oven;
- wherein the guide path is configured to determine relative movement between the outer die and the inner punch as a function of a position of the mould assembly along the guide path; wherein the guide path is defined by a rail having a profile corresponding to the relative movement of the outer die and the inner punch between the open configuration and the forming configuration; and
- wherein the controller is configured to control performance of the plurality of press forming operations by controlling movement of the mould assembly along the guide path.

17. Forming apparatus according to claim 16, wherein a relative separation between the outer die and the inner punch during relative movement is a function of a position of the mould assembly along the guide path; and
- wherein the controller is configured to vary a speed of the mould assembly along the guide path to achieve a predetermined transient profile of the relative separation which differs from any transient profile of relative separation corresponding to constant speed of the mould assembly along the guide path.

18. Forming apparatus according to claim 16, configured to cause performance of a method comprising:
- placing a dough in the mould assembly between the outer die and the inner punch;
- heating the dough by heat transfer through the mould assembly to cause the dough to expand and bake;
- performing the plurality of successive press forming operations, each press forming operation comprising relative movement between the outer die and the inner punch from the open configuration to the forming configuration to shape the dough as it expands, wherein the dough expands between at least two successive press forming operations to fill and expand beyond the container wall volume while the inner punch is separated from the dough in the open configuration, before baking is completed to provide the container, wherein the plurality of press forming operations include:
  the first press forming operation in which the dough occupies a sub-portion of the container wall volume with the mould assembly in the forming configuration; and
  the subsequent press forming operation in which a waste portion of dough expanding beyond the container wall volume is caused to pass through the gap at the mould rim
  wherein the gap is defined between the inner punch and the outer die in the forming configuration; and
removing the waste portion from the container.

* * * * *